United States Patent [19]

Kunzler et al.

[11] Patent Number: 5,006,622

[45] Date of Patent: Apr. 9, 1991

[54] POLYMER COMPOSITIONS FOR CONTACT LENSES

[75] Inventors: Jay F. Kunzler, Mayfield, Ohio; Gary D. Friends, Ontario, N.Y.

[73] Assignee: Bausch & Lomb Incorporated, Rochester, N.Y.

[21] Appl. No.: 34,292

[22] Filed: Apr. 2, 1987

[51] Int. Cl.$^5$ ............................................. C08F 32/00
[52] U.S. Cl. ..................................... 526/309; 526/304; 560/220; 564/204; 351/160 H
[58] Field of Search ................ 526/304, 309; 560/220; 564/204; 351/160 H

[56] References Cited

U.S. PATENT DOCUMENTS

| | | | |
|---|---|---|---|
| 2,976,576 | 3/1961 | Wichterle | 18/58 |
| 3,220,960 | 11/1965 | Wichterle | 260/2.5 |
| 3,402,153 | 9/1968 | Jaeger et al. | 526/309 |
| 3,438,043 | 4/1969 | Shephard | 343/819 |
| 3,520,949 | 7/1970 | Shepherd | 260/857 |
| 3,563,925 | 2/1971 | Kliment | 260/8 |
| 3,566,874 | 3/1971 | Shepherd | 128/349 |
| 3,607,848 | 9/1971 | Stoy | 260/86.1 |
| 3,679,504 | 7/1972 | Wichterle | 156/62 |
| 4,436,887 | 3/1984 | Chromecek | 526/263 |

Primary Examiner—Joseph L. Schofer
Assistant Examiner—Peter D. Mulcahy
Attorney, Agent, or Firm—Christopher E. Blank; Craig E. Larson

[57] ABSTRACT

Branched alkylhydroxycycloalkyl methacrylate monomers, such as t-butylhydroxycyclohexyl methacrylate, are polymerized with hydrophilic monomers and crosslinking agents to produce compositions for shaped biomedical devices, including soft contact lenses. Such copolymers have high oxygen permeability and good mechanical properties.

3 Claims, No Drawings

POLYMER COMPOSITIONS FOR CONTACT LENSES

BACKGROUND OF THE INVENTION

This invention relates to polymeric compositions formed by reacting a hydrophilic monomer, a hydrophobic strengthening agent monomer, a crosslinking agent monomer and a polymerization iniatiator. The novel hydrophobic strengthening agent monomer provides increased strength without decreasing the oxygen permeability of the polymer material.

Soft contact lens materials are made by polymerizing and crosslinking hydrophilic monomers such as 2-hydroxyethylmethyacrylate, N-vinyl-2-pyrrolidone, and combinations thereof. The polymers produced by polymerizing these hydrophilic monomers exhibit significant hydrophilic character themselves, and are capable of absorbing a significant amount of water in their polymeric matrices. Due to their ability to absorb water, these polymers are often referred to as "hydrogels". These hydrogels are optically clear and, due to their high levels of water of hydration, are particularly useful materials for making soft contact lenses. However, the high levels of water of hydration of hydrogels contributes to their relative lack of physical strength which results in hydrogel contact lenses being relatively easy to tear.

Various hydrophobic monomers have been copolymerized with these hydrophilic monomers in order to obtain polymers with improved physical strength. Such hydrophobic monomers include styrene, and various acrylates and methacrylates such as methylmethacrylate, isobornylmethacrylate, and t-butylcyclohexylmethacrylate.

For instance, Chromecek teaches that t-butylcyclohexylmethacrylate is a particularly useful monomer when copolymerized with 2-hydroxyethylmethylacrylate in U.S. Pat. No. 4,436,887. However, while these state of the art hydrophobic monomers do increase the physical strength of hydrogel polymers, they also produce polymers with lower levels of water of hydration than unmodified hydrogels. It is an object of the present invention to provide polymeric materials with increased physical strength and high levels of water of hydration.

SUMMARY OF THE INVENTION

According to the present invention it has been found that certain hydrophobic monomers act as strengthening agents when copolymerized with hydrophilic monomers such as 2-hydroxyethylmethacrylate, N-vinyl-2-pyrrolidone and the like. These hydrophobic strengthening agent monomers are represented by the general formula

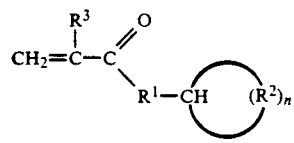

wherein:
$R^3$ is H or $CH_3$;
$R^2$ is an divalent alkylene radical chosen from the group consisting of $—CH_2—$, $—CHOH—$, and $—CHR^4$ where $R^4$ denotes a branched alkyl group with 3 to 8 carbon atoms and preferably with 4 to 6 carbon atoms; and
$R^1$ denotes O or NH; the $R^2$ radicals are chosen so that at least one $—CHOH—$ radical is present, at least one $—CHR^4—$ radical is present and is separated from the $—CHOH$ radical by at least one $—CH_2—$ radical; and n is 4, 5, 6, or 7.

Copolymers of the present invention's hydrophobic monomers with hydrophilic monomers used in the production of hydrogel materials exhibit substantial hydrophilic character, and substantially greater mechanical strength than state of the art hydrogel materials.

DETAILED DESCRIPTION OF THE INVENTION

The present invention relates to hydrophobic monomers which can be copolymerized with hydrophilic monomers used in making soft contact lenses in order to provide polymeric materials with improved strength. These materials may also contain crosslinking agents and polymerization initiators. Thus, the present invention also relates to the product of polymerizing hydrophilic monomers with hydrophobic monomer strengthening agents and, optimally, crosslinking agents and polymerization initiators.

By weight the hydrophilic monomers comprise from 35 to 90 weight percent of a mixture useful in forming soft contact lenses. The novel hydrophobic strengthening agents comprise from 10 to 65 weight percent, the crosslinking agent comprises from 0 to 5 weight percent and the polymerization initiator comprises from 0 to 5 weight percent of the mixture to be polymerized.

The novel hydrophobic strengthening agent monomers of the present invention useful in soft contact lens compositions are represented by the general formula

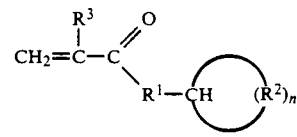

wherein:
$R^1$ is O or NH;
$R^2$ is chosen from the group of radicals consisting of $—CH_2—$, $—CHOH—$, and $—CHR^4—$ where $R^4$ denotes a branched alkyl radical with 3 to 8 carbon atoms and preferably 4 to 6 carbon atoms;
$R^3$ is H or $CH_3$; and
n is 4, 5, 6 or 7.

At least one $R^2$ radical is $—CHOH—$ and at least one $R^2$ radical is $—CHR—$ and these two radicals are separated by at least one $—CH_2—$ radical.

These branched alkyl hydroxy cycloalkyl acrylates, or the corresponding methacrylates, acrylamides and methacrylamides are effective strengthening agents in soft contact lens polymeric compositions. The resulting polymers are optically clear and possess a combination of high levels of water of hydration and good mechanical properties.

Non-limiting examples of the hydrophobic strengthening agent monomers of the present invention include:

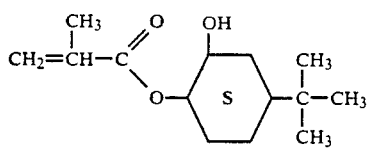

(4-t-butyl, 2-hydroxycyclohexyl methacrylate (TBE));

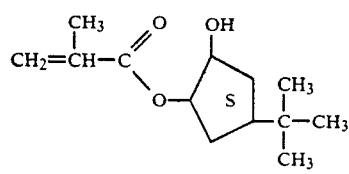

(4-t-butyl, 2-hydroxycyclopentyl methacrylate);

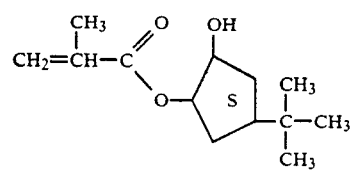

(methacryloylamino-4-t-butyl-2-hydroxycyclohexane);

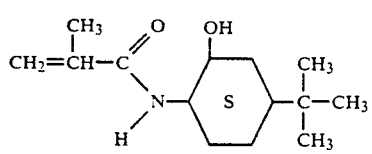

(6-isopentyl,3-hydroxycyclohexyl methacrylate);

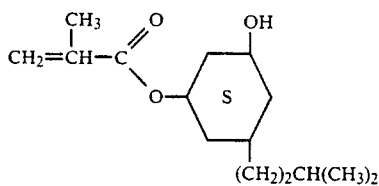

(methacryloylamino, 2-isohexyl, 5-hydroxy cyclopentane);

The hydrophilic monomers useful in the present invention are those known in the art to be useful in making soft contact lenses. The following are non-limiting examples of hydrophilic monomers useful in contact lens formulations of this invention:

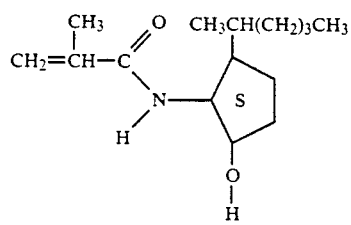

(2-hydroxyethyl methacrylate (HEMA));

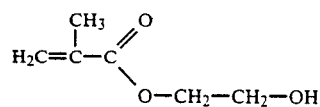

(N-(2-hydroxy ethyl)-methacrylamide);

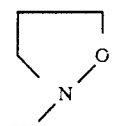

(N-vinyl-2-pyrrolidone (NVP));

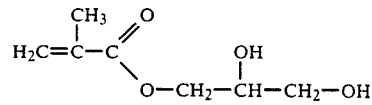

(glyceryl methacrylate (GM));

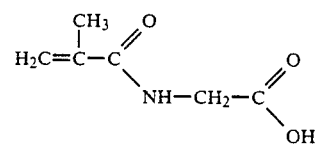

(N-methacryloyl glycine (MG));

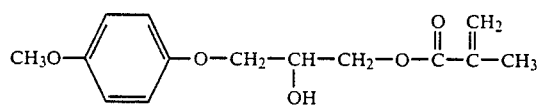

(2-hydroxyl-3-methacryl(propyl)-4 meloxy phenylether);

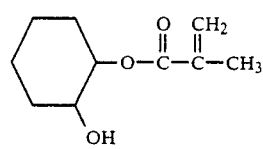

(2-hydroxy cyclohexylmethacrylate).

The crosslinking agents which are useful in the present invention are those crosslinkers known in the art to be useful in making soft contact lenses. The following are non-limiting examples of crosslinking agents useful in contact lens formulations of this invention:

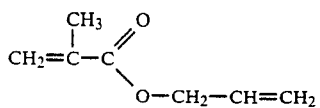

(allyl methacrylate);

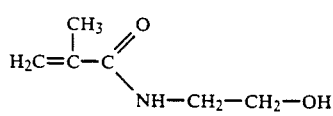

(ethylene glycol dimethacrylate (EGDMA));

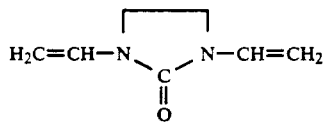

(divinyl ethylene urea (DVEU)); and

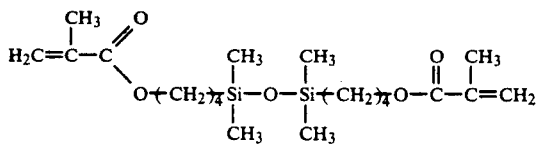

(1,3-bis (4 methacryloxybutyl) tetramethyl disiloxane).

Various mixtures of hydrophilic monomers, hydrophobic strengthening agent monomers, and optionally crosslinking agents can be used to produce polymeric materials useful in contact lenses. The following table provides several examples of such useful mixtures. The table does not exhaust the list of examples which are within the scope of the invention.

TABLE I

| Hydrophilic Monomer(s) | Strengthening Agent Monomer(s) | Crosslinking Monomer(s) |
|---|---|---|
| hydroxyethylmethacrylate (HEMA) | 4-t-butyl-2 hydroxy-cyclohexyl-methacrylate (TBE) | ethyleneglycol dimethacrylate (EGDMA) |
| HEMA | 4-t-butyl-2-hydroxy-cyclohexyl-methacrylamide (TBA) | EGDMA |
| HEMA | octafluoropentyl methacrylate (OFPMA)/TBE | EGDMA |
| HEMA/N-methacryloyl glycine | TBA | EGDMA |
| N-vinyl 2-pyrrolidone (NVP) | TBE | DVEU |
| NVP | TBE | DVEU/EGDMA |
| NVP | TBE | Allyl methacrylate |
| Glyceryl methacrylate (GM) | TBE | EGDMA |
| HEMA/GM | TBE | EGDMA |
| NVP | OFPMA/TBE | DVEU |

The most preferred contact lenses of the instant invention have an oxygen transport rate of at least about $2 \times 10^{-6} cm^3/(sec. \ cm^2 \ atm.)$, are hydrolytically stable, biologically inert, transparent, resilient, and have a softness preferably of about 60 or below on the Shore hardness A scale when hydrated. The more preferred materials have a Shore hardness between 25 to 35 on the A scale. The tensile modulus of elasticity of these hydrated polymers is at least about 50 g/mm$^2$, preferably from about 75 g/mm$^2$ to about 100 g/mm$^2$ and the tear strength is at least about 2.0 g/mm thickness, preferably from about 2.0 g/mm to about 250 g/mm thickness. High tensile modulus of elasticity is desirable for strength and durability. High tear strength is desirable in order to prevent damage to the contact lens (1) due to tearing during patient use, i.e., the removing and the placing of the lens in the eye, and (2) to prevent damage to the lens during cleansing and disinfecting.

Soft contact lenses, made from the polymers of the instant invention, can be made large enough to cover the entire cornea of the eye, resulting in more comfort because of their good oxygen permeability. Conventional hard contact lenses have to be made smaller due to their poor oxygen transportability. Furthermore, the larger the lenses, the easier it is to locate the optical center of the lenses. The larger the lens the easier it is to maintain the optical axis which is required in making special lenses for people with astigmatism. Another advantage of the preferred soft lenses of the instant invention is the instant preferred soft lenses have a softness similar to HEMA lenses but are more oxygen permeable. HEMA lenses are not oxygen permeable or capable of transporting oxygen to a degree necessary to meet all the requirements of the human cornea, especially for extended wear applications.

While the polymers of the instant invention can be used to prepare contact lenses, these polymers can also be used to make other shaped articles for use in biomedical applications. These polymers can be used to make biomedical devices such as dialyzer diaphragms used in artificial kidneys and other biomedical implants, such as disclosed in Wichterle, U.S. Pat. No. 2,976,576 and Wichterle U.S. Pat. No. 3,220,960. The instant polymers can be used in preparing therapeutic bandages as disclosed in Shephard, U.S. Pat. No. 3,438,043. The instant polymers can also be used in preparing such medical surgical devices as heart valves, vessel substitutes, intrauterine devices, membranes, films, dialyzer diaphragms, catheters, mouth guards, denture liners and other such devices as disclosed in Shephard U.S. Pat. No. 3,520,949 and Shephard U.S. Pat. No. 3,618,231. The instant polymers can be used to modify collagen to make blood vessels, urinary bladders and other such devices as disclosed in Kliment U.S. Pat. No. 3,563,925. The instant polymers can be used to make catheters as disclosed in Shephard U.S. Pat. No. 3,566,874. The polymers can be used in semipermeable sheets for dialysis, artificial dentures and all of such disclosures as set forth in Stoy U.S. Pat. No. 3,607,848. The instant polymers can be used in ophthalmic prostheses and all other uses disclosed in Wichterle U.S. Pat. No. 3,679,504.

The shaped articles for use in biomedical applications made from the polymers of this invention have physiochemical properties rendering them suitable for prolonged contact with living tissue, blood or the mucous membrane such as surgical implants, blood dialysis devices, blood vessels, artificial ureters, artificial breast tissue and membranes intended to come in contact with body fluids outside of the body, for example, membranes for kidney dialysis and heart/lung machines, and the like. For example, it is known that blood is rapidly damaged in contact with artificial surfaces. The design of a synthetic surface which is antithrombogenic and nonhemolytic is necessary for prosthesis and devices which contact blood. The polymers of the present invention provide such surfaces.

The polymers disclosed herein can be boiled and/or autoclaved in water without being damaged, whereby sterilization may be achieved. Thus, an article formed from the instant polymers disclosed herein may be used in surgery where an article compatible with living tissue or with the mucous membrane is required.

The polymers disclosed herein can be used in shaped articles in hydrated states and can contain high amounts of water of hydration.

DESCRIPTION OF THE PREFERRED EMBODIMENTS

The utility of the compositions of this invention as soft contact lens formulations is illustrated in the following examples Examples 1, 3, 6, 7, 8 (in part), and 9 illustrate the use of 4-t-butyl-2-hydroxycyclohexyl methacrylate (TBE), a preferred strengthening agent of this invention. Example 2 illustrates the use of 4-t-butyl-2-hydroxy cylohexyl methacrylamide, which is another preferred strengthening agent of this invention. For comparative purposes, examples 4, 5, 8 (in part) and 10 illustrate the use of t-butylcyclohexyl methacrylate, which is a state of the art strengthening agent outside the scope of this invention, and which differs from the strengthening agent of the invention only in the absence of a hydroxy group on the cycohexyl substituent of the monomer.

EXAMPLE 1

A mixture was made containing 77.0 g of glycerylmethacylate, 22.5 g of 4-t-butyl-2-hydroxycyclohexyl methacrylate, and 0.5 g of ethyleneglycol dimethacrylate. To this mixture was added 0.5 g of benzoin methyl ether, an ultra violet induced polymerization initiator. The solution was cast between glass plates separated by a Teflon (DuPont registered trademark) perfluoro polymer gasket 0.3 mm thick and cured. After curing, the film was released from the glass plates and hydrated and extracted in hot distilled water for 4 hours.

Next the film was placed in a borate buffered saline solution for testing. The resultant material was optically clear and had a water content of 53% and an oxygen permeability of $18.0 \times 10^{-11}$ cm$^3$ cm/(sec. cm$^2$ mmHg) The mechanical properties were measured according to the following test methods and gave the following results:

| PROPERTIES (RESULT) | TEST METHOD |
| --- | --- |
| Young's modulus of elasticity (60 g/mm$^2$) | ASTM-D 1708 |
| Tensile strength (84 g/mm$^2$) | ASTM-D 1708 |
| % Elongation (164%) | ASTM-D 1708 |
| Tear Initiation (3.8 g/mm) | ASTM-D 1938 |

EXAMPLE 2

A mixture of 83.5 parts by weight of 2-hydroxyethyl methacrylate, 10 parts of 4-t-buty-2-hydroxycyclohexyl methacrylamide, 6 parts of n-methacryloylglycine, and 0.5 parts of ethylene glycol dimethacrylate was made. To this mixture was added 0.17 parts by weight of benzoin methyl ether, a U.V. initiator, and 10 parts by weight of ethylene glycol as a diluent. The mixture was placed between glass plates and cured as described in Example 1. The resultant polymer when hydrated had a water content of 65% and an oxygen permeability of $33 \times 10^{-11}$ cm$^3$ cm/(sec. cm$^2$ mmHg) The mechanical properties measured were the following:

| PROPERTY | MEASURED VALUE |
| --- | --- |
| Young's modulus of elasticity | 44 g/mm$^2$ |
| Tensile Strength | 34 g/mm$^2$ |
| % Elongation | 139 |
| Tear Initiation | 2.0 g/mm |

EXAMPLE 3

A mixture was prepared using 89.9 parts of n-vinyl-2-pyrrolidinone, 10 parts of 4-t-butyl-2-hydroxycyclohexyl methacrylate, 0.1 parts of divinyl ethylene urea and 1 part of 2,2-azobis(isobutyronitrile) and 0.1 part of 2-2 azobis(2,4-dimethyl-4-methoxyvaleronitrile). The solution was purged with nitrogen for 10 minutes and then poured into polypropylene tubes having a diameter of 18 mm and a length of 300 mm. The tubes were closed then immersed in a constant temperature bath and heated to 32° C. for 72 hours, then raised to 45° C. and held for 48 hours, and then raised to and held at 60° C. for 48 hours. The resultant rod was removed from the water bath and placed in an oven at 90° C. for 2 hours for post curing. Cylinders were cut from the rod and annealed by heating for 1 hour at 110° C. and cooled down very slowly. From these cylinders, flat discs or lenses were machined by conventional techniques. The lenses and discs were placed in hot distilled water for four hours to hydrate and extract solvents from them. Last, the lenses and discs were placed in isotonic saline for testing. The materials were optically clear, soft, tough and biologically compatible with eye tissue. Preliminary clinical testing of lenses was favorable. The discs have water contents of 83% and oxygen permeabilities of $59 \times 10^{-11}$ cm$^3$ cm/(sec cm$^2$ mmHg). The mechanical properties of the materials measured were:

| PROPERTY | MEASURED VALUE |
| --- | --- |
| Young's modulus of elasticity | 60 g/mm$^2$ |
| Tensile Strength | 97 g/mm$^2$ |
| % Elongation | 223 |
| Tear Initiation | 6.2 g/mm |

EXAMPLE 4

Mixtures of 40 parts of 2-hydroxyethylmethacrylate, 60 parts of glyceryl methacrylate and X parts of 4-t-butylcyclohexyl methacrylate, 0.5 parts of ethylene glycoldimethacrylate and 0.5 parts of benzoin methyl ether, where X was 5, 7, and 10 parts, were made. Films were cast by placing the mixtures between glass plates as described in Example 1. After hydration, the films were not optically clear.

EXAMPLE 5

Example 4 was repeated except 4-t-butyl-2-hydroxycyclohexyl methacrylate was used in place of t-butylcyclohexyl methacrylate. The resultant films were transparent and tough. Up to 30 parts of the 4-t-butyl-2-hydroxycyclohexyl methacrylate was added to the mixture and the resultant films were optically clear. This demonstrates the solubilizing aspect of this strengthening monomer and shows that it can be used in higher concentrations than state of the art strengthening or strengthening agents.

COMPARATIVE EXAMPLE USING t-BUTYLHYDROXYCYCLOHEXYL METHACRYLATE AND t-BUTYLCYCLOHEXYL METHACRYLATE

EXAMPLE 6

Films were made by the methods of Example 1 using the following compositions:
(A) 2-Hydroxyethyl methacrylate (HEMA) 83.4 parts, n-methacryloylglycine (MG) 6 parts, ethyleneglycoldimethacrylate (EGDMA) 0.6 parts, t-butylcyclohexyl-methacrylate (t-BCM) 10.0 parts, and benzoin methyl ether (BME) 0.17 parts by total weight;
(B) HEMA 83.5 parts, MG 6.0 parts, 10 parts t-butylhydroxycyclohexyl methacrylate (TBE) and 0.5 parts EGDMA. To this mixture was added 0.17 parts by weight BME and 15 parts ethylene glycol as a diluent;
(C) HEMA 73.5 parts, MG 6 parts, 20 parts TBE and 0.5 parts EGDMA. To this mixture was added 0.17 parts by weight of BME and 15 parts of ethylene glycol as a diluent; and
(D) HEMA 63.5 parts, MG 6.0 parts, TBE 30 parts and 0.5 parts EGDMA. To this mixture was added 0.17 parts BME and 15 parts ethylene glycol.

The physical properties of the cast films were measured and are reported in Table 2.

TABLE 2

| PROPERTY | FORMULATION | | | |
| --- | --- | --- | --- | --- |
| | A | B | C | D |
| Young's modulus of elasticity g/m$^2$ | 142 | 44 | 97 | 5,860 |
| Tensile strength g/m$^2$ | 65 | 40 | 49 | 293 |
| % Elongation | 75 | 166 | 113 | 95 |
| Tear Initiation g/mm | 51 | 25 | 78 | 66 |
| % Water | 56 | 65 | 58 | 49 |
| Oxygen Permeability DK | 16.2 | 34 | 27 | 16.2 |

The results show substantially more TBE can be added without affecting the oxygen permeability of the resulting polymer. The upper solubility limit for t-BCM was found to be about 15 parts before films were not optically clear on hydration. Although more TBE is required to obtain the same toughness as obtained by the strengthening agents of the present invention, this does not impact the oxygen permeability.

COMPARATIVE EXAMPLE USING CYCLOHEXYLMETHACRYLATE, t-BUTYLCYCLOHEXYL METHACRYLATE AND TBE

EXAMPLE 7

A mixture was made using 84.7 parts of n-vinyl-2-pyrrolidinone, 15 parts of TBE and 0.3 parts of EGDMA. To this mixture was added 0.5 parts of 2,2-azobis (isobutyronitrile). The mixture was cast between glass plates as described in Example 1. The samples were cured in an oven for 2 hours at 60° C., 1 hour at 80° C. and 1 hour at 100° C.. The film was released and boiled in distilled water for 4 hours, then put in a saline solution and tested. The properties of the film are reported below:

| PROPERTY | MEASURED VALUE |
| --- | --- |
| Tangent modulus of elasticity | 1100 g/mm$^2$ |
| Tensile strength | 220 g/mm$^2$ |
| % Elongation | 88 |
| Initial Tear | 19.9 g/mm |
| % Water | 73.8 |
| Oxygen Permeability | 40 |

EXAMPLE 8

Example 7 was repeated except cyclohexl methacrylate and t-butyl-cyclohexyl methacrylate were used to replace the TBE. The film was clear on casting, but immediately turned cloudy on hydration. That is, the material was not optically clear. This supports the conclusion that the novel monomer acts to toughen the material and to solubilize the components in the polymer.

Examples 1, 2, 3, 6, and 7 show that polymer compositions employing the strengthening agents of this invention are optically clear, possess high water contents, good oxygen permeability levels and good mechanical properties. The best results of this invention were obtained in Example 3, wherein the hydrophilic agent is N-vinyl-2-pyrrolidinone. The formulation of Example 3 provides a remarkably high water level and oxygen permeability while retaining unusually good mechanical properties. Based upon this data, the polymeric hydrogels of this invention can have water of hydration contents of 60, 70 or 80 weight percent, or more Polymeric soft contact lens hydrogels of the prior art can achieve moderately elevated water of hydration levels while retaining good mechanical properties but can only achieve highly elevated water of hydration levels at the expense of good mechanical properties. For example, many such hydrogels with water of hydration levels of about 70 weight percent retain some mechanical properties. However, soft contact lens polymeric hydrogels of the prior art having water of hydration levels of 80 percent, or more, exhibit sharply reduced mechanical properties. In contrast to the prior art, the present invention is capable of producing polymeric soft contact lens hydrogels having water of hydration levels of 80, 82 or 85 weight percent, or more, while retaining good mechanical properties including Young's modulus of elasticity of at least 50 g/mm$^2$, generally; at least 75 g/mm$^2$, preferably; a nd at least 100 g/mm$^2$, most preferably; and an initial tear resistance of at least 2 g/mm, generally; at least 7 g/mm, preferably; and at least 10 g/mm, most preferably.

Table 1 shows the results of tests made with various formulations of N-vinyl-2-pyrrolidinone (NVP), 4-t-butyl, 2-hydroxycyclohexyl methacrylate (TBE) and ethylene glycol dimethyacrylate (EDGMA) crosslinker. The formulations are given in weight percent.

TABLE 1

| Monomer-Wt. Percent | | | Modulus of Elasticity g/mm² | Tensile Strength g/mm² | Elongation % |
| --- | --- | --- | --- | --- | --- |
| NVP | TBE | EGDMA | | | |
| 84.642 | 15.058 | 0.299 | 1100 | 220 | 88.5 |
| 84.391 | 15.001 | 0.604 | 1530 | 214 | 65.0 |
| 84.103 | 14.993 | 0.900 | 1990 | 231 | 51.9 |
| 87.176 | 12.497 | 0.321 | 604 | 130 | 83.6 |
| 86,868 | 12.500 | 0.632 | 794 | 157 | 66.4 |
| 86.587 | 12.516 | 0.898 | 868 | 173 | 66.4 |
| 89.672 | 10.003 | 0.325 | 178 | 83.6 | 97.4 |
| 89.381 | 10.011 | 0.608 | 313 | 94.9 | 72.3 |
| 89.067 | 10.008 | 0.912 | 448 | 106.0 | 57.3 |
| 89,668 | 10.006 | 0.300 | 192 | 83.5 | 83.6 |
| 91,677 | 8.017 | 0.306 | 835 | 48.2 | 81.6 |
| 93,673 | 6.011 | 0.310 | 20.7 | 22.6 | 73.2 |
| 89,723 | 10.048 | 0.276 | 208 | 78.4 | 81.5 |
| 90,727 | 9.038 | 0.282 | 134 | 69.1 | 95.5 |
| 91.762 | 8.007 | 0.266 | 75.5 | 44.5 | 79.8 |
| 91.653 | 8.005 | 0.319 | 69 | 43.9 | 84.3 |
| 91.354 | 8.031 | 0.602 | 156 | 68.2 | 79.4 |
| 91.101 | 7.999 | 0.854 | 217 | 77.9 | 67.5 |
| 89,607 | 10.074 | 0.299 | 174 | 77.7 | 97.0 |
| 89,060 | 10.039 | 0.602 | 308 | 93.3 | 74.8 |
| 89.137 | 8.012 | 0.847 | 200 | 68.4 | 62.3 |
| 93.697 | 6.003 | 0.299 | 21.2 | 13.4 | 51.1 |
| 93.051 | 10.029 | 0.597 | 26.6 | 92.0 | 81.4 |
| 93.084 | 10.008 | 0.892 | 36.2 | 103.0 | 65.0 |

Table 2 shows the results of tests made to show water of hydration with various formulations of N-vinylpyrrolidinone (NVP), 4-t-butyl, 2-hydroxycyclohexyl methacrylate (TBE), and diveinylethylene urea (DVEU). The results also show the amount of monomer and oligomers extractable from the polymer.

TABLE 2

| WEIGHT PERCENT | | | | WATER WT. % | EXTRACT WT. % |
| --- | --- | --- | --- | --- | --- |
| NVP | TBE | DVEU | PLASTIZER | | |
| 77.5 | 11 | 1.5 | 10 | 74.7 | 5.66 |
| 65.5 | 14 | 0.5 | 20 | 75.8 | 7.42 |
| 85.5 | 14 | 0.5 | 0 | 77.1 | 15.8 |
| 84.5 | 14 | 1.5 | 0 | 71.7 | 11.7 |
| 90.5 | 8 | 1.5 | 0 | 77.5 | 14.6 |
| 71.5 | 8 | 0.5 | 20 | 82.6 | 6.9 |
| 91.5 | 8 | 0.5 | 0 | 83.1 | 11.4 |
| 68.0 | 11 | 1.0 | 20 | 74.5 | 2.5 |
| 81.0 | 8 | 1.0 | 10 | 80.2 | 2.7 |
| 70.5 | 8 | 1.5 | 20 | 76.4 | 2.1 |
| 64.5 | 14 | 1.5 | 20 | 67.6 | −0.4 |
| 85.0 | 14 | 1.0 | 0 | 73.9 | 6.1 |
| 88.5 | 11 | 0.5 | 0 | 80.0 | 12.1 |
| 86.7 | 13 | 0.3 | 0 | 80.1 | 11.9 |
| 71.0 | 8 | 1.0 | 20 | 79.0 | 0.08 |
| 65.0 | 14 | 1.0 | 20 | 72.3 | 2.7 |
| 75.5 | 14 | 0.5 | 10 | 76.3 | 4.4 |
| 86.7 | 13 | 0.3 | 0 | 79.7 | 14.5 |

TABLE 2-continued

| WEIGHT PERCENT | | | | WATER WT. % | EXTRACT WT. % |
| --- | --- | --- | --- | --- | --- |
| NVP | TBE | DVEU | PLASTIZER | | |
| 70.5 | 14 | 0.5 | 15 | 76.7 | 6.7 |
| 70.0 | 14 | 1.0 | 15 | 73.9 | 4.4 |
| 82.5 | 11 | 1.5 | 5 | 71.5 | −2.2 |
| 86.0 | 8 | 1.0 | 5 | 77.4 | −1.7 |
| 81.5 | 8 | 0.5 | 10 | 81.9 | 2.9 |
| 75.5 | 14 | 0.5 | 10 | 75.7 | 4.2 |
| 80.5 | 8 | 1.5 | 10 | 74.7 | −3.3 |
| 74.4 | 14 | 1.5 | 10 | 69.0 | −1.7 |
| 78.0 | 11 | 1.0 | 10 | 76.3 | 3.4 |
| 80.5 | 14 | 0.5 | 5 | 76.4 | 9.2 |

Table 2 shows the high water of hydration levels achieved with the tested polymeric composition of this invention. All of the polymers showed hydration levels above 60 weight percent, most of the polymers showed hydration levels above 70 or 75 percent and some showed hydration levels above 80 percent. High levels of water of hydration are conducive to good oxygen permeability.

Table 3 shows the results of tests performed with two different polymer formulations of this invention. The first formulation was prepared from N-vinylpyrrolidinone (NVP), t-butyl 2-hydroxycyclohexyl methacrylate and divinylethylene urea (DVEU). The second formulation was prepared from N-vinyl-2-pyrrolidinone (NVP), t-butyl, 2-hydroxycyclohexyl methacrylate (TBE), divinylethylene urea (DVEU) and ethylene glycol dimethacrylate (EGDMA).

TABLE 3

| Formulation | Modulus of Elasticity (g/mm²) | Tensile Strength g/mm² | Elongation % | Tear, Initial (g/mm) | Tear, Propagation (g/mm) | $H_2O$, Wgt. % |
| --- | --- | --- | --- | --- | --- | --- |
| NVP/TBE/DVEU (Wgt. %) | | | | | | |
| 89.7/10/.3 | 48.7 | 58.1 | 233.0 | 5.0 | 82.5 | |
| 86.7/13/.3 | 117.0 | 89.5 | 220.0 | 7.7 | 80.2 | |
| 85.7/14/.3 | 132.0 | 100.0 | 238.0 | 10.9 | 79.1 | |
| 83.7/16/.3 | 218.0 | 124.0 | 217.0 | 15.9 | 79.5 | |
| 83.7/16/.3 | 283.0 | 132.0 | 234.0 | 15.4 | 75.7 | |
| NVP/TBE/DVEU/ EGDMA (Wgt. %) | | | | | | |
| 89.5/10/.25/.25 | | 75.2 | 87.6 | 228.0 | 6.2 | 85.4 |
| 90/9/0/.3 | 129.0 | 97.0 | 111.0 | 5.9 | 82.7 | |

Table 3 shows that the formulations of this invention which employ N-vinyl pyrrolidone as the hydrophilic monomer can achieve water levels of at least 85 weight percent. Formulations which employ t-butylhydroxycyclohexyl methacrylamide as the strengthening agent can achieve water levels above 79 weight percent. These high water levels are achieved while maintaining good mechanical properties.

EXAMPLE 9

The following three synthetic procedures describe the synthesis of two intermediates used to make TBE, and the TBE synthesis.

EXAMPLE 9A

Synthesis of 4-t-butylcyclohexene 4-t-butylcyclohexene, an intermediate in the synthesis of 4-t-butylhydroxycyclohexyl methacrylate, is prepared by reacting 4-t-buylcyclohexanol, a commercially available material, with phosphoric acid. A mixture of 4-t-butylcyclohexanol and phosporic acid is made by slow addition of the acid to the 4-t-butylcyclohexanol. This mixture is refluxed at about 70° C. until the reaction is complete. The reaction mixture is extracted with an organic solvent such as ethylacetate, dried over Mg SO4 and filtered. The theoretical reaction is:

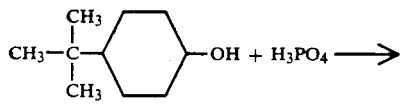

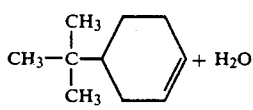

EXAMPLE 9B

Synthesis of 4-t-butyl-2-epoxycyclohexene 4-t-butyl-2-epoxycyclohexane, an intermediate in the synthesis of 4-t-butylhydroxycyclohexyl methacrylate, is prepared by reacting a 4-t-butylcyclohexane with m-chloroperoxybenzoic acid in ethylacetate below 5° C. until mixing is complete, and then at room temperature for two hours. The reaction mixture is washed with aqueous NA2CO3, dried over MgSO4, and filtered. The theoretical reaction is:

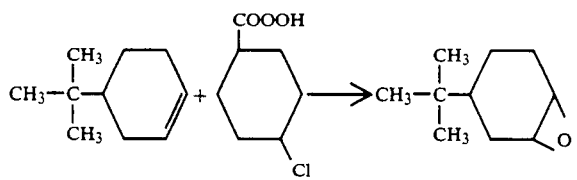

EXAMPLE 9C

Synthesis of 4-t-butyl-hydroxycyclohexyl methacrylate 4-t-butyl-2-epoxycyclohexane and methacrylic acid are reacted in the presence of CuCl, BHT and TEA for about 2 hours at about 90° C. Low boiling components are distilled off and the final product is purified by further distillation. The theoretical reaction is:

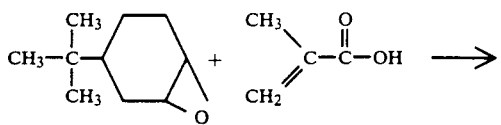

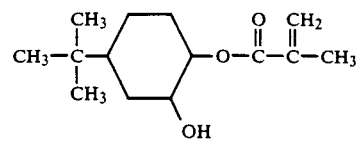

What is claimed is:

1. The polymerization product of a mixture comprising: 35 to 90 part by weight of N-vinylpyrrolidone; 0.1 to 5 parts by weight of crosslinking agent; 0.01 to 5 parts by weight of catalyst; and 10 to 65 parts by weight of a strengthening agent represented by the general formula

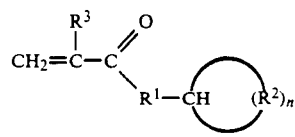

wherein:

$R^1$ is O or NH;

$R^2$ is a divalent alkylene radical chosen from the group consisting of —$CH_2$—, —CHOH— and —$CHR^4$ wherein $R^4$ is a branched alkyl group with 3 to 8 carbon atoms, and $R^3$ is H or $CH_3$;

and wherein at least one $R^2$ radical is —CHOH— and at least one $R^2$ is —$CHR^4$ and are separated by at least one —$CH_2$— radical, and n is 4, 5, 6 or 7.

2. The polymerization product of claim 1 wherein said strengthening agent is 4-t-butyl, 2 hydroxycyclohexyl methacrylate.

3. The polymerization product of claim 1 wherein said strengthening agent is 4-t-butylhydroxycyclohexyl methacrylamide.

* * * * *